Feb. 11, 1958
W. KOHLHAGEN
2,823,327
REACTION-TYPE SYNCHRONOUS MOTOR WITH
LIFELONG PERMANENT MAGNET ROTOR
Filed July 22, 1955
2 Sheets-Sheet 1
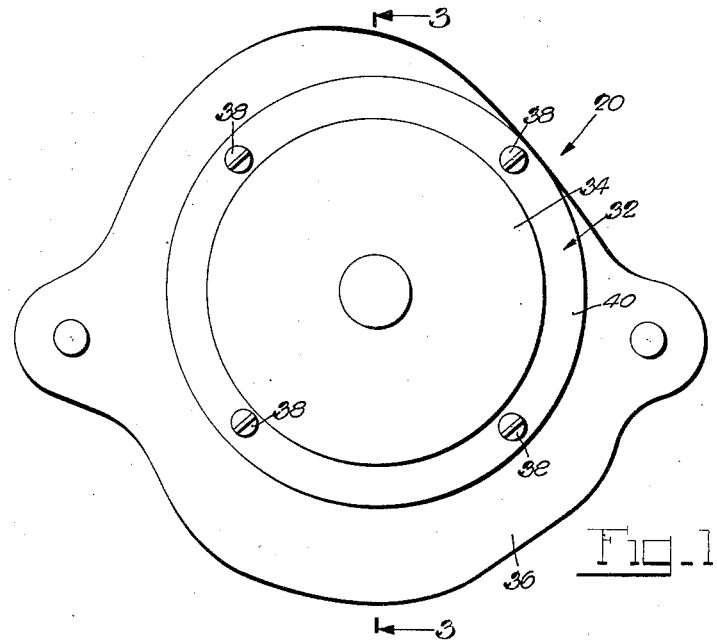
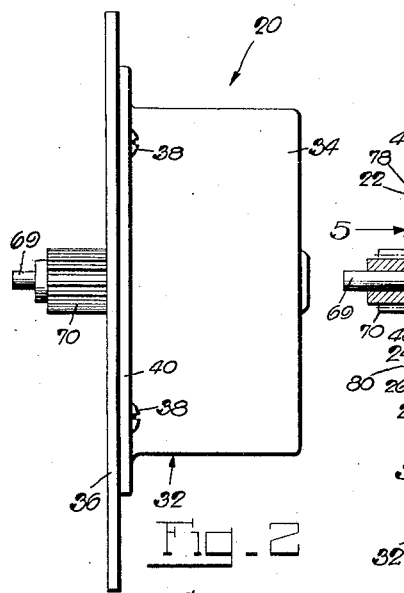
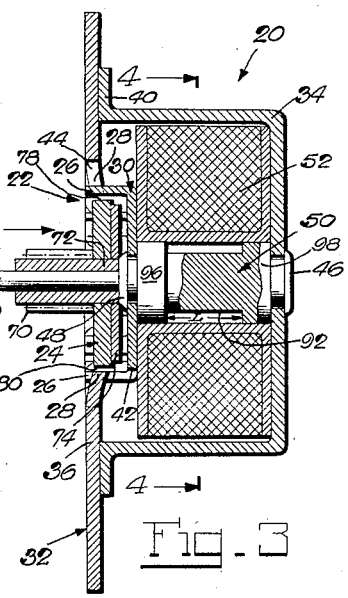
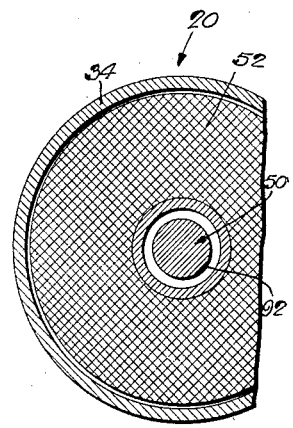
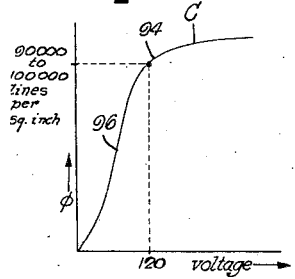
INVENTOR.
Walter Kohlhagen
BY
Walter Granger
Attorney.

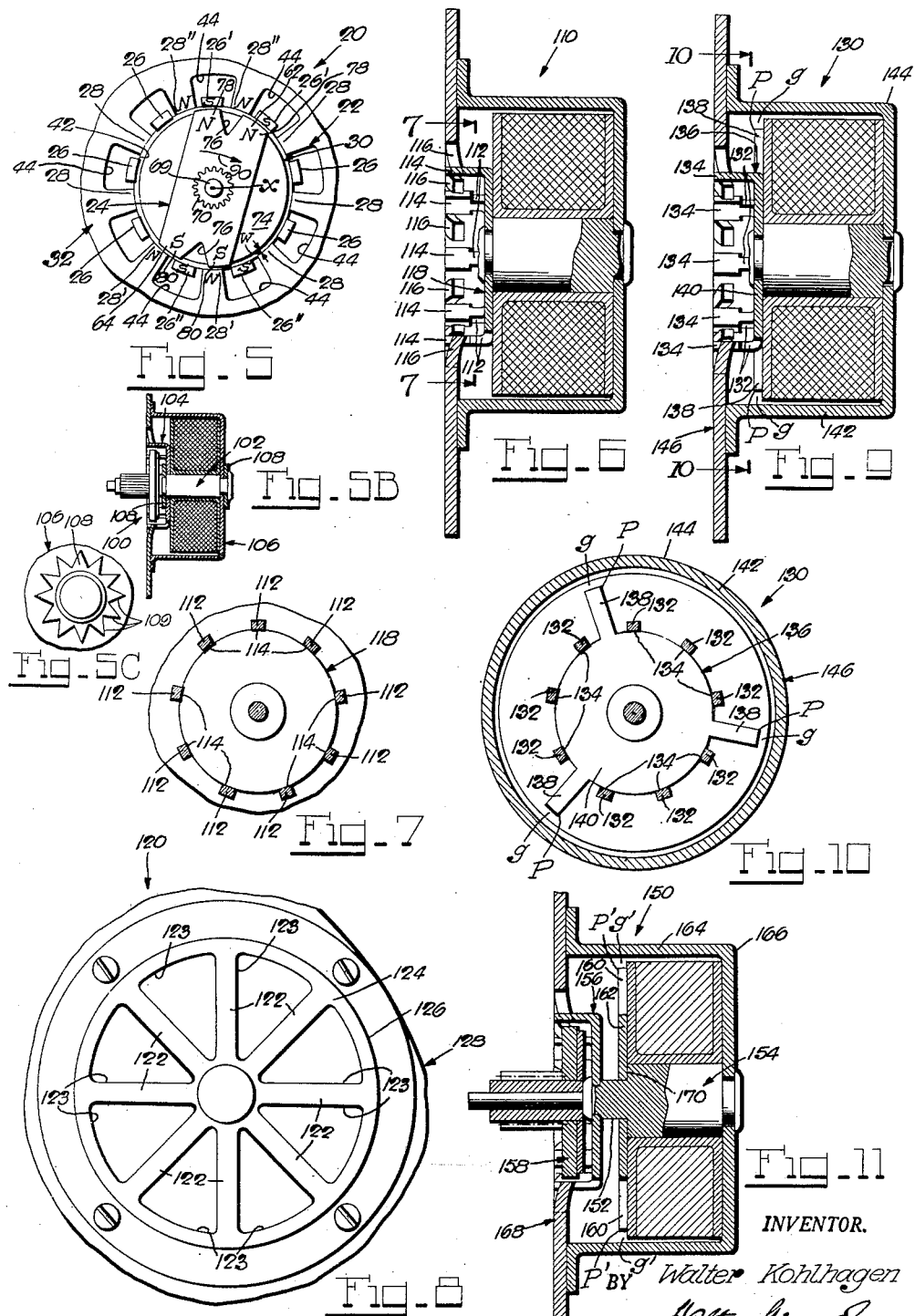

United States Patent Office 2,823,327
Patented Feb. 11, 1958

2,823,327

REACTION-TYPE SYNCHRONOUS MOTOR WITH LIFELONG PERMANENT MAGNET ROTOR

Walter Kohlhagen, Elgin, Ill., assignor to The E. Ingraham Company, Bristol, Conn., a corporation of Connecticut Application July 22, 1955, Serial No. 523,733

16 Claims. (Cl. 310—162)

This invention relates to synchronous reaction motors in general, and to motors of the permanent magnet rotor type in particular.

Motors of this type are characterized by their structural simplicity and low cost, and are for these reasons used quite extensively in many industrial fields, such as the timepiece and timer fields, for instance. While these motors are generally satisfactory in many respects, they are seriously deficient in other respects. Thus, one of their greatest deficiencies is a gradual, and oftentimes sudden, change in their operating characteristics, with the result that they perform no longer satisfactorily or fail altogether. This is caused primarily by unavoidable transient conditions which tend to demagnetize their permanent magnet rotors and oftentimes succeed in reducing the strength of the latter to the point where they perform unsatisfactorily or fail altogether in their performance. These harmful transients result in excessive flux surges through the permanent magnet rotor caused by sudden A. C. current surges through the field winding which are most apt to occur on closing and opening the circuit of the latter. Thus, a highly excessive inrush of current into the field winding, and hence an excessive flux surge through the permanent magnet rotor, is inevitable when the circuit of the field winding is being closed at the moment when the A. C. voltage is near zero and varies at its greatest rate, for it is then that a much larger current flows than during normal operation of the motor so as to build up a large E. M. F. to counteract the rapid voltage change. Excessive current flow through the field winding and resulting damaging flux surge through the permanent magnet rotor may also occur on opening the circuit of the field winding, especially when the motor is connected in parallel in a large inductive field constituted by other electromagnetic equipment, such as driving motors, relays or solenoids in automatic dishwashers and the like, which may generate very large voltage surges when the current is being interrupted.

Various expediencies have been resorted to heretofore to prevent, or at least greatly minimize, the demagnetizing effect of transients upon the permanent magnet rotors of motors of this type. Thus, these rotors are frequently made so large in size that they will withstand the high flux surges resulting from these transients without becoming appreciably demagnetized. However, among the chief requirements nowadays of motors of this type are small size dictated by available space, design and other considerations, as well as low cost dictated by even more compelling market considerations. Obviously, large size permanent magnet rotors are anything but conducive toward meeting these imperative requirements, nor are they conducive to avoid noise generation or creeping out of synchronism with the applied current under transient conditions.

Another expediency deals with a flux-shielding winding on a permanent magnet rotor which is short-circuited on itself, such as shown and described in the patent to Merrill, No. 2,078,805, dated April 27, 1937. However, this expediency entails not only an additional part in the motor construction in the form of the flux-shielding winding, but also the added cost of the latter and the further cost of its application to the rotor.

Still another expediency deals with the provision on a permanent magnet rotor of a conducting loop having sufficient conductivity for resisting a harmful amount of flux change in the permanent magnet, such as shown and described in the patent to Kober, No. 2,632,123, dated March 17, 1953. However, this expediency entails the same disadvantages as those described above in connection with the Merrill expediency.

It is an object of the present invention to make provisions in a motor of this type for rendering transients harmless insofar as their remagnetizing effect upon the permanent magnet rotor is concerned, without adding any special part or parts for that purpose to the motor and, further, without making the permanent magnet rotor any larger than is required for its satisfactory performance under required load conditions and over the normal wide voltage range determined solely by the available current and the load on the motor and without any consideration of the effect transients will have upon this voltage.

It is another object of the present invention to provide a motor of this type whose rotor remains for an indefinite length of time unaffected by normal or even severe transients, as aforementioned, and is designed with the sole objective in mind to achieve optimum use of its permanent magnetic material for normal starting and running of the motor, thereby permitting the use of a permanent magnet rotor of exceedingly small size and cost, and hence an over-all construction of the motor of minimum size and low over-all cost.

It is a further object of the present invention to provide a motor of this type in which transients are rendered harmless without adding any part or parts to the motor structure for that purpose while permitting the use of an exceedingly small permanent magnet rotor, as aforementioned, and which will unfailingly start under given load conditions at the lower as well as higher voltages within the normal range.

Another object of the present invention is to provide a motor of this type in which transients are rendered harmless insofar as their adverse effect upon the strength of the permanent magnet rotor is concerned, and which has substantially uniform starting and running characteristics over the wide voltage range, thereby to avoid at the higher voltages violent oscillation of the rotor and the ensuing objectionable noise and possible forward creep of the rotor out of synchronism with the applied current.

A further object of the present invention is to provide a motor of this type in which saturation of a part of the ferro-magnetic field structure is relied upon to choke off any harmful flux surge through the permanent magnet rotor when the current flow through the field winding becomes much larger than usual as the result of a transient, thereby to protect the rotor against demagnetization from the effect of transients without adding any part or parts to the motor structure for this purpose while permitting the use of a rotor of exceedingly small size determined only by considerations of its optimum performance and without any regard to transients, as aforementioned.

It is another object of the present invention to provide a motor of this type in which the aforementioned saturation part of the ferro-magnetic field structure is cross-sectionally and longitudinally so dimensioned that at the upper limit of the normal voltage range the flux flow, while adequate for normal operation of the motor, is sufficiently throttled to protect the permanent magnet rotor from the demagnetizing effect of transients and also prevent fluttering of the rotor, while at the lower limit of the normal voltage range the flux flow is substantially unimpeded and essentially the same as if the field structure were not saturated at the high voltages, thereby maintaining proper self-starting characteristics of the motor at the lower voltages.

It is a further object of the present invention to provide a motor of this type which in its field structure is provided with a flux leakage path which in the magnetic circuit of the motor is in parallel with the rotor and the aforementioned saturation part of the field structure, so that only a small portion of the total flux will leak through this path at the lower limit of the normal voltage range, but additional flux will leak therethrough when at the upper limit of the normal voltage range the saturation part of the field structure becomes saturated and the magnetic potential of the leakage path is raised, thereby achieving by proper proportioning of the saturation part of the field structure and of the flux leakage path a more constant impedance over the entire useful voltage range.

Other objects and advantages will appear to those skilled in the art from the following, considered in conjunction with the accompanying drawings.

In the accompanying drawings, in which certain modes of carrying out the present invention are shown for illustrative purposes:

Fig. 1 is an end view of a motor embodying the present invention;

Fig. 2 is a side view of the same motor;

Fig. 3 is a longitudinal section through the motor as taken on the line 3—3 of Fig. 1;

Fig. 4 is a fragmentary cross section through the motor, taken on the line 4—4 of Fig. 3;

Fig. 5 is a fragmentary end view of the motor as seen in the direction of the arrow 5 in Fig. 3;

Fig. 5A is a graph indicating an exemplary relationship between applied voltage and flux flow in the motor;

Fig. 5B is a longitudinal section, at a reduced scale, through a motor embodying the present invention in a modified manner;

Fig. 5C is an enlarged fragmentary end view of the modified motor shown in Fig. 5B;

Fig. 6 is a longitudinal section through a motor embodying the present invention in another modified manner;

Fig. 7 is a fragmentary cross section through the modified motor of Fig. 6 as taken on the line 7—7 thereof;

Fig. 8 is a fragmentary end view of a motor embodying the present invention in a further modified manner;

Fig. 9 is a longitudinal section through a motor embodying the present invention in another modified manner;

Fig. 10 is a cross section through the modified motor of Fig. 9 as taken on the line 10—10 thereof; and Fig. 11 is a longitudinal section through a motor embodying the present invention in still another modified manner.

Referring to the drawings, and more particularly to Figs. 1 to 5 thereof, the reference numeral 20 designates an electric motor having a field structure 22 and an armature or rotor 24. The field structure 22 comprises two sets of field poles 26 and 28 which are provided on separate field casing sections 30 and 32, respectively. The casing section 32 comprises a cup-shaped member 34 and a plate member 36 secured by screws 38, for instance, to a flange 40 on the cup-shaped member 34. The plate member 36 is died out (Fig. 5) to provide a circular opening 42 for the rotor 24, and a plurality of equiangularly spaced tooth-like formations which constitute the field poles 28 and are separated from each other by gaps 44.

The casing sections 30 and 32 are suitably secured in this instance by riveting as at 46 and 48, to the opposite ends of a post or core 50 (Fig. 3). The field poles 26 and 28 are circularly arranged in alternate order in the fashion shown in Fig. 5. More particularly, the field poles 26 project into the gaps 44 between successive field poles 28 and are equally spaced therefrom. The core 50 and the casing sections 30 and 32 with their respective field poles 26 and 28 constitute the stator of the motor.

As shown in Fig. 3, a field coil 52 is placed around the post 50 and between the casing sections 30 and 32. Single-phase alternating current may be supplied to this coil from any suitable source. The casing sections 30, 32 and the core 50 are made of any suitable non-permanent magnetic material. Since the radial portions of the casing sections 30 and 32 are located on opposite sides of the field coil 52, these casing sections are, during energization of the field coil, magnetized at any given instant in such a way that they are of opposite polarity. Accordingly, the alternate field poles 26 and 28 are of opposite polarity at any given instant, and their polarity changes in phase with the alternating current supplied to the field coil 52.

Referring now to the rotor 24, the same is in the simple form of a substantially rectangular plate or bar the opposite end edges 62 and 64 of which extend concentrically with respect to the rotary axis x of the rotor (Fig. 5) and are, in the present instance, notched at 76 to provide pairs of spaced poles 78 and 80, respectively. The rotor 24 is a permanent magnet the pole pairs 78 and 80 of which are of opposite polarity, such as north and south as indicated in Fig. 5, for instance.

Suitably mounted on a forwardly projecting shank 69 of the core 50 is a pinion 70 for driving connection of the instant motor with a clock mechanism or any other timing device. In the present instance, the rotor 24 is suitably mounted on a hub portion 72 of the pinion 70 (Fig. 3). Preferably secured to the rotor 24 is a disc 74 of non-magnetic material which serves as a flywheel to prevent surging of the rotor and, instead, compel it to turn uniformly when the field coil 52 is energized.

The motor described so far is in all essential respects like or similar to that described in my prior Patent No. 2,677,776, dated May 4, 1954, which is self-starting by virtue of the provision of the pole pairs 78 and 80 at the opposite ends of the rotor 24 and certain coordination of these pole pairs with the field poles 26 and 28, all as fully described in said patent.

Let it now be assumed that the motor has self-started and that the rotor 24 is driven clockwise in the direction of the arrow 90 in Fig. 5, the instantaneous polarities of the field poles 26 and 28 adjacent the pole pairs 78 and 80 of the rotor may then be as indicated in Fig. 5, with the result that the north and south pole pairs 78 and 80 will be further attracted to the adjacent momentary south and north field poles 26' and 28' and repelled by the adjacent momentary north and south field poles 28" and 26". As soon as the pole pairs 78 and 80 of the rotor 24 pass through full alignment with the adjacent field poles 26' and 28', the polarities of all field poles reverse, resulting in continued clockwise attraction of the north and south pole pairs 78 and 80 of the rotor by the then nearest south and north field poles, respectively, and continued clockwise repulsion of these pole pairs by the then nearest north and south field poles, respectively. The rotor 24 is thus propelled forward, clockwise in the present example (Fig. 5), on successive polarity changes of the field poles 26 and 28 in phase with the current applied to the field coil.

It is one of the characteristics of the present motor that its rotor 24 is of a minimum size arrived at solely from the consideration of its satisfactory performance under given load conditions and over the normal voltage range of the indicated current, and without any consideration of the effect unavoidable transients will have upon the voltage and, hence, upon the permanent magnet rotor. In thus reducing the size of the rotor 24 to a minimum, the over-all dimensions of the motor may be reduced to the extent of meeting even the most exacting size limitations dictated by available space, design and other considerations, as well as cost limitations dictated by equally compelling market considerations. However, in order that this motor may have a long useful life, it is imperative that provisions be made for rendering transients harmless insofar as their demagnetizing effect upon the permanent magnet rotor of the motor is concerned.

In accordance with the present invention, these transients are rendered harmless in their effect upon the permanent magnetism of the rotor 24 by forming the stator over a length of its flux path of such minimum cross-sectional area as to become substantially saturated thereat with magnetic flux at a normal maximum current flow in the field coil 52. In doing so, any damaging flux surge in consequence of any of the aforementioned transient conditions, or in the event the motor is accidentally connected with a current of higher voltage than indicated, is effectively choked off at this stator length of minimum cross-sectional area and thus prevented from surging through the permanent magnet rotor and have a permanent demagnetization effect upon the same.

In the present exemplary motor 20 the stator length of minimum cross-sectional area, which is to be substantially saturated with magnetic flux at a normal maximum current flow in the field coil 52, is provided by a cross-sectionally constricted length 92 of the core 50 (Figs. 3 and 4). While the cross-sectional area of this constricted core length 92 must be such as to become substantially saturated with magnetic flux at the upper or maximum limit of the normal voltage range so as to choke off any damaging flux surge to the rotor 24 under transient conditions, this cross-sectional area is also such as to permit unimpeded flux flow therethrough at the minimum or lower limit of the normal voltage range. Thus, assuming that the motor is adapted for operation with 110 v. current, the upper and lower limits of the normal voltage range may, for example, be 120 v. and 80 v. Accordingly, it is a desideratum to select the cross-sectional area of the constricted core length 92 such that at 80 v. flux will unimpededly flo wtherethrough, while at 120 v. substantial maximum flux will flow therethrough which, however, is already impeded or throttled to such an extent that the flux flow therethrough will not appreciably increase at even much higher voltages. This may be achieved, by way of example, by selecting the cross-sectional area of the constricted core length 92 such that the flux density thereat is in a range between substantially 90,000 and substantially 100,000 lines per square inch at the upper limit of the normal voltage range, say 120 v., in the abruptly curved top continuation 94 of the substantially linearly ascending portion 96 of the flux-voltage curve C in Fig. 5A. In thus selecting the cross-sectional area of the constricted core length 92, the flux flow therethrough at the lower limit of the normal voltage range, say 80 v., is unimpeded and sufficiently high to assure running of the motor at full efficiency, and the flux flow through the constricted core length, while also sufficiently high at the upper limit of the normal voltage range to assure running of the motor at full efficiency, will due to the flux-throttling effect of the constriction increase only inappreciably, and in any event insufficiently to have a permanent magnetizing effect upon the permanent magnet rotor 24 when the voltage climbs even quite considerably above the upper limit of the normal voltage range under transient conditions.

I have also found that the desired saturation of a part of the stator at the upper limit of the normal voltage range, in order to be effective for the intended purpose, is not dependent only on the cross-sectional area of this stator part, but also on its length in the direction of the flux path therethrough. Thus, in order that the stator portion of minimum cross-sectional area, in the present example the constricted core portion 92, may be fully effective for the intended purpose, its length L (Fig. 3) must be at least several times larger than the width $w$ of the air gap between the pole pairs of the rotor 24 and the field poles 26 and 28 (Fig. 5), although the length L of the constricted core portion 92 is in Fig. 3 shown much larger than actually required.

It is significant in this connection that it is an intermediate length of the core 50 which is of the requisite minimum cross-sectional area for saturation under the explained conditions, so that the opposite end lengths 96 and 98 of the core may be of sufficiently large cross-sectional area to preclude saturation of their engagement areas with the relatively thin-walled casing sections 30 and 32 at the lower and even higher useful voltages which, if permitted, would result not only in inadequate flux flow at the higher voltages and, hence, unsatisfactory performance of the motor under these conditions, but also in excessive draw of current by the motor at all voltages.

Reference is now had to Fig. 5B which shows a motor 100 that may in all respects be like the described motor 20, except that the saturation part of the field structure is formed at the joinder of the center core 102 with either or both field casing sections 104 and 106. In that case, the core 102 may be of uniform diameter throughout, as shown, and its cross-sectional area is such as not to become saturated with magnetic flux at any of the voltages in the useful range. However, in order to preclude saturation of the joinder between the core 102 and either of the thin-walled casing sections 104 and 106 at all voltages lower than substantially the upper limit of the normal voltage range, this joinder between the core and each casing section is sufficiently enlarged by a fairly large washer 108 thereat. It is desirable to saturate over the desired length of the flux path in the field structure at a uniform flux density. This may be achieved, for example, by making the washer or washers 108 star-shaped on the outside, as at 109 in Fig. 5C, in a manner to decrease the area of the washer outwardly in approximate proportion to its radial spacing from the core center.

Fig. 6 shows another modified motor 110 which may in all essential respects be like or similar to the described motor 20, except that the saturation part of the field structure is formed by constricted lengths 112 of one of the sets of longitudinal field pole pieces 114 and 116, in this instance the field pole pieces 114 (see also Fig. 7). The casing section 118 with the field poles 114 and their constricted base lengths 112 may conveniently be blanked from suitable sheet stock and formed in one operation.

Fig. 8 shows another modified motor 120 which may in all essential respects be like or similar to the described motor 20, except that the saturation part of the field structure is formed by a plurality of radially diverging ribs or spokes 122 which may be formed by suitable cutouts 123 in the bottom wall 124 of the cup-shaped member 126 of the outer field casing section 128. Thus, each of the spokes 122 is of such cross-sectional area as to become substantially saturated with magnetic flux at the upper limit of the useful voltage range.

Figs. 9 and 10 show a further modified motor 130 which in all essential respects is like or similar to the motor 110 of Fig. 6, except that the present motor is also provided with a flux leakage path P (see also Fig. 10). Thus, the saturation part of the field structure of the instant motor is formed by constricted base lengths 132 of the longitudinal field pole pieces 134 on the inner field casing section 136, the same as in the motor 110. The flux leakage path may be provided anywhere and in any manner so as to be in parallel with the rotor (not shown) and the saturation part of the field structure in the magnetic circuit of the motor. In the present example, the flux leakage path P is provided by several radial tongue extensions 138 on the bottom wall 140 of the casing section 136 (Fig. 10), and air gaps $g$ between the outer ends of these tongue extensions and the adjacent cylindrical wall 142 of the cup-shaped member 144 of the outer field casing section 146. The flux leakage path P is such that only a small portion of the total flux will leak through this path at the lower limit of the useful voltage range, but additional flux will leak therethrough when at the upper limit of the useful voltage range the saturation part of the field structure becomes saturated and the magnetic potential of the leakage path is raised. By properly proportioning the saturation part of the field structure and the flux leakage path, a more constant impedance over the entire useful voltage range is attained, with the result that the motor will assuredly self-start and perform uniformly at top efficiency over the entire useful voltage range and will not give rise either to violent oscillation of the rotor and noise generation or to a forward creep of the rotor out of synchronism with the applied current.

Reference is now had to Fig. 11 which shows a motor 150 of which the saturation part of the field structure is formed by a constricted end length 152 of the center core 154, the engagement area between this constricted core end length 152 and the inner field casing section 156 being in this instance larger than the cross-sectional area of the constricted core length 152 to preclude saturation of this engagement area with magnetic flux under any operating conditions of the motor. Thus, it is the constricted or reduced portion 152 of considerable length which will become saturated at the upper limit of the useful voltage range to protect the permanent magnet rotor 158 from the permanent demagnetizing effect of transients.

The instant motor 150 is also provided with a flux leakage path P' which serves the same purpose as the flux leakage path P in the motor 130 of Fig. 9. In the present instance, the leakage path P' is formed by several radial tongue extensions 160 on a disc 162 of non-permanent magnetic material, and air gaps g' between the outer ends of these tongue extensions and the adjacent cylindrical wall 164 of the cup-shaped member 166 of the outer field casing section 168. The disc 162 is mounted on the core 154 in abutment with an annular shoulder 170 thereon from which the constricted core length 152 extends forwardly so that the flux leakage path P' is in parallel with the rotor 158 and the saturation part 152 of the field structure in the magnetic circuit of the motor.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous reaction-type motor, the combination of a permanent magnet rotor having poles of opposite signs; and a field structure comprising a stator of non-permanent magnetic material having sets of circularly arranged field poles in cooperating relation with said rotor poles with successive poles of said sets alternating with and spaced from each other, and a field coil in flux-inducing relation with said stator, said rotor having such a minimum cross-sectional area as permanently to lose magnetic strength on subjection to abnormal flux surges induced by current surges above a normal maximum current flow in said coil, and said stator being over a sufficient length of its flux path therein of such minimum cross-sectional area that its maximum flux density at the normal minimum voltage is below substantial saturation, but at said normal maximum voltage has reached such saturation as to prevent permanent demagnetization of said rotor under transient conditions.

2. In a synchronous reaction-type motor, the combination of a permanent magnet rotor having poles of opposite signs; and a field structure comprising a stator of non-permanent magnetic material including a center core and field casing sections carried on the opposite ends of said core and providing sets of circularly arranged field poles, respectively, in cooperating relation with said rotor poles with successive poles of said sets alternating with and spaced from each other, and a field coil in said casing sections and around said core in flux-inducing relation with said stator, said core being at least over a length thereof of such minimum cross-sectional area that its maximum flux density at the normal minimum voltage is below substantial saturation, but at the normal maximum voltage has reached such saturation as to prevent permanent demagnetization of said rotor under transient conditions.

3. In a synchronous reaction-type motor, the combination of a permanent magnet rotor having poles of opposite signs; and a field structure comprising a stator of non-permanent magnetic material including a center core and field casing sections in engagement with and carried on the opposite ends of said core and providing sets of circularly arranged field poles, respectively, in cooperating relation with said rotor poles with successive poles of said sets alternating with and spaced from each other, and a field coil in said casing sections and around said core in flux-inducing relation with said stator, the engagement areas between said casing sections and respective core ends being sufficiently large to prevent substantial flux saturation thereat at normal maximum voltage, and said stator being over a length of its flux path therein of such minimum cross-sectional area that its maximum flux density at the normal minimum voltage is below substantial saturation, but at said normal maximum voltage has reached such saturation as to prevent permanent demagnetization of said rotor under transient conditions.

4. The combination in a synchronous reaction-type motor as set forth in claim 3, in which said stator length of minimum cross-sectional area is formed by a cross-sectionally reduced intermediate length of said core.

5. In a synchronous reaction-type motor, the combination of a permanent magnet rotor having poles of opposite signs; and a field structure comprising a stator of non-permanent magnetic material having sets of circularly arranged longitudinal field pole pieces with pole faces in cooperating relation with said rotor poles and with successive pole pieces of said sets alternating with and spaced from each other, and a field coil in flux-inducing relation with said stator, each of the pole pieces of one set being over a length thereof remote from its pole face of such minimum cross-sectional area that its maximum flux density at the normal minimum voltage is below substantial saturation, but at the normal maximum voltage has reached such saturation as to prevent permanent demagnetization of said rotor under transient conditions.

6. The combination in a synchronous reaction-type motor as set forth in claim 5, in which the cross-sectional area of each pole piece of said one set at its pole face is larger than that of said length thereof.

7. In a synchronous reaction-type motor, the combination of a permanent magnet rotor having poles of opposite signs; and a field structure comprising a stator of non-permanent magnetic material including a center core and field casing sections provided with disc-like portions centrally carried by the opposite ends of said core and sets of circularly arranged field poles, respectively, in cooperating relation with said rotor poles with successive poles of said sets alternating with and spaced from each other, and a field coil in said casing sections and around said core in flux-inducing relation with said stator, the disc-like portion of one of said field casing sections being cut away in part to leave outer and inner ring parts joined by spoke means of such minimum cross-sectional area that its maximum flux density at the normal minimum voltage is below substantial saturation, but at the normal maximum voltage has reached such saturation as to prevent permanent demagnetization of said rotor under transient conditions.

8. The combination in a synchronous reaction-type motor as set forth in claim 7, in which said partly cut-away disc-like portion of said one field casing section is the bottom of a cup-shaped outer field casing section in which said coil is received around said core.

9. In a synchronous reaction-type motor, the combination of a permanent magnet rotor having poles of opposite signs; a field structure comprising a stator of non-permanent magnetic material having sets of circularly arranged field poles in cooperating relation with said rotor poles with successive poles of said sets alternating with and spaced from each other, and a field coil in flux-inducing relation with said stator, said stator being over a length of its flux path therein of such minimum cross-sectional area that its maximum flux density at the normal minimum voltage is below substantial saturation, but at the normal maximum voltage has reached such saturation as to prevent permanent demagnetization of said rotor under transient conditions; and means providing in the magnetic circuit of said stator and rotor a flux leakage path in parallel with said rotor and said stator length of minimum cross-sectional area.

10. In a synchronous reaction-type motor, the combination of a permanent magnet rotor having poles of opposite signs; a field structure comprising a stator of non-permanent magnetic material having an inner core part and inner and outer field casing parts carried on the opposite ends of said core part and providing sets of circularly arranged field poles, respectively, in cooperating relation with said rotor poles with successive poles of said sets alternating with and spaced from each other, and a field coil in said casing parts and around said core part in flux-inducing relation with said stator, one of said inner parts being over a length of its flux path therein of such minimum cross-sectional area that its maximum flux density at the normal minimum voltage is below substantial saturation, but at the normal maximum voltage has reached such saturation as to prevent permanent demagnetization of said rotor under transient conditions; and a track of non-permanent magnetic material extending from one of said inner parts toward said outer part but being spaced from the latter by an intervening air gap to define in the magnetic circuit of said stator and rotor a flux leakage path in parallel with said rotor and said part length of minimum cross-sectional area.

11. The combination in a synchronous reaction-type motor as set forth in claim 10, in which said core part is over a length of its flux path of said minimum cross-sectional area, and said track extends from said core part.

12. In a synchronous reaction-type motor, the combination of a permanent magnet rotor having poles of opposite signs; a field structure comprising a stator of non-permanent magnetic material including a center core and inner and outer field casing sections carried on the opposite ends of said core and providing first and second sets of circularly arranged longitudinal field pole pieces, respectively, with pole faces in cooperative relation with said rotor poles and with successive pole pieces of said sets alternating with and spaced from each other, and a field coil in said casing sections and around said core in flux-inducing relation with said stator, each of the pole pieces of said first set being over a length thereof remote from its pole face of such minimum cross-sectional area that its maximum flux density at the normal minimum voltage is below substantial saturation, but at the normal maximum voltage has reached such saturation as to prevent permanent demagnetization of said rotor under transient conditions; and a track of non-permanent magnetic material extending from said inner casing section outwardly toward said outer casing section but being spaced from the latter by an air gap to define in the magnetic circuit of said stator and rotor a flux leakage path in parallel with said rotor and said lengths of minimum cross-sectional areas of the pole pieces of said first set.

13. In a synchronous reaction-type motor, the combination of a permanent magnet rotor having poles of opposite signs; and a field structure comprising a stator of non-permanent magnetic material including a center core having reduced ends leaving the former with annular shoulders, field casing sections provided with relatively thin disc portions received by said reduced core ends, respectively and seated against the respective shoulders and sets of circularly arranged field poles, respectively, in cooperating relation with said rotor poles with successive poles of said sets alternating with and spaced from each other, washers received by and secured to said reduced core ends, respectively, and abutting the adjacent disc portions, and a field coil in said casing sections and around said core in flux-inducing relation with said stator, each of said core shoulders and reduced ends and the associated disc portions and washer constituting a joint between said core and associated casing section, and at least one of said joints being of such minimum cross-sectional area that its maximum flux density at the normal minimum voltage is below substantial saturation, but at the normal maximum voltage has reached such saturation as to prevent permanent demagnetization of said rotor under transient conditions.

14. The combination in a synchronous reaction-type motor as set forth in claim 13, in which at least the washer at said one joint is so shaped that its circumferential area decreases with its distance from the core center.

15. The combination in a synchronous reaction-type motor as set forth in claim 1, in which the maximum flux density in said stator length of minimum cross-sectional area is above 90,000 lines per square inch at said normal maximum voltage.

16. The combination in a synchronous reaction-type motor as set forth in claim 1, in which said stator length of minimum cross-sectional area is at least several times longer than the width of the air gap between said rotor and field poles.

References Cited in the file of this patent
UNITED STATES PATENTS

| | | |
|---|---|---|
| 1,935,208 | Hayden | Nov. 14, 1933 |
| 1,966,897 | Lofgren | July 17, 1934 |
| 2,492,197 | Schellens | Dec. 27, 1949 |